United States Patent [19]
Dobson et al.

[11] Patent Number: 5,429,250
[45] Date of Patent: Jul. 4, 1995

[54] SEPARATION APPARATUS

[76] Inventors: Austin J. Dobson, 6 West Street, Rockhampton, Queensland 4700; George M. R. Dobson, 189 Stamford Street, North Rockhampton, Queensland 4701, both of Australia

[21] Appl. No.: 154,619

[22] Filed: Nov. 18, 1993

[51] Int. Cl.⁶ .............................................. B04C 1/00
[52] U.S. Cl. .................................. 209/713; 209/722
[58] Field of Search ............... 209/710, 711, 712, 713, 209/715, 717, 720, 721, 725, 727, 728, 732, 733, 734, 714, 642, 638, 722

[56] References Cited

U.S. PATENT DOCUMENTS

| | | | |
|---|---|---|---|
| 1,514,915 | 11/1924 | Laukhuff | 209/720 |
| 2,593,294 | 4/1952 | Goldberg | 209/713 X |
| 2,645,347 | 7/1953 | Baxter, Jr. | 209/725 |
| 2,849,117 | 8/1958 | Rietema | 209/720 X |
| 4,005,998 | 2/1977 | Gorman | 209/720 X |
| 4,265,741 | 5/1981 | Im | 209/725 |
| 4,296,864 | 10/1981 | Misaka et al. | 209/714 X |
| 4,344,538 | 8/1982 | Fujisawa et al. | 209/717 X |
| 4,378,289 | 3/1983 | Hunter | 209/725 X |
| 4,454,825 | 6/1984 | Musto | 209/713 X |
| 4,560,474 | 12/1985 | Holik | 209/725 X |

*Primary Examiner*—D. Glenn Dayoan
*Attorney, Agent, or Firm*—Iandiorio & Teska

[57] ABSTRACT

A separation vessel (10) for separating materials of different densities comprising a chamber (14) having an external periphery (20A) at least part thereof which progressively increases from one section to another section. A mixture of materials of different densities enters the chamber (14) through an inlet (13) and travels in a spiralling vortex progressively outwardly to the widest section of the chamber (14). A primary exit (17) for material of greater density is provided closely adjacent to the widest section. A secondary exit (16) for material of lesser density is also provided.

3 Claims, 3 Drawing Sheets

SEPARATION APPARATUS

FIELD OF THE INVENTION

This invention relates to a separation vessel for separating materials or fluids of different densities and in particular for separating particulate material from gaseous material such as air.

BACKGROUND OF THE INVENTION

While the invention will be described hereinafter in relation to separation of particulate material from a gaseous fluid and thus concerns pneumatic conveyors in particular, it will be appreciated that this is only an application of the invention and that the separation apparatus of the invention may be used for separating any number of fluids of different densities such as different liquids, liquids and solids or solids and gases.

A conventional separation apparatus normally comprises a separation vessel which is usually a cylindrical vessel, a tangential inlet such as an inlet pipe connected thereto so that solid material such as finely divided particles, is projected substantially tangentially into the cylindrical vessel to form a spiralling vortex under the influence of gravity as well as by centripetal force. Normally air which is entrained with the finely divided particles is vented through a top wall of the cylindrical vessel. There is also provided an inlet fan or air blower which is responsible for projecting the mixture of air and finely divided particles through the inlet pipe. Usually the cylindrical vessel has a lower component or base which is frusto conical which has an outlet located along a common axis of the cylindrical vessel and the frusto conical base. When the finely divided particulate or solid material is conveyed through the outlet this usually occurs totally under the influence of gravity as frictional effects have reduced the centripetal force. By this stage, normally complete separation of particulate material and air has occurred.

A conventional media separator such as the one described above is described in Australian patent specification 511162. Other media separators are described in Australian patent specifications 519141 and 505915.

Usually the separation vessel associated with conventional separation apparatus is very large and bulky. The separation vessel is normally upright in attitude requiring considerable support structure and has an inlet fan or air blower which is substantially smaller in size. While the conventional separation apparatus as described above is efficient in operation it was usually not possible to transport the particulate material directly into a vehicle such as truck. Usually the particulate material had to be conveyed into a stationary collection receptacle located below the outlet. It was also not normally possible to utilise conventional separation apparatus on vehicles where large volumes of air are involved because they were too cumbersome or too large for this purpose. This meant that conventional separation apparatus could not be utilised for farming or agricultural purposes for example in achieving separation of a mixture comprising seeds entrained with a gaseous vehicle such as air.

Another disadvantage of conventional separation apparatus was that because of its size the separation vessel was a fixed installation and thus could only be moved with great difficulty. This also meant that the conventional separation apparatus was expensive to buy and could not be utilised in some circumstances where limited space was available.

It therefore is an object of the invention to provide separation apparatus which may alleviate the above-mentioned disadvantages of the prior art.

SUMMARY OF THE INVENTION

In accordance with one aspect of the present invention there is disclosed a separation vessel for the separation of materials of different densities comprising:

- a separation vessel having a chamber having an external periphery at least part thereof which progressively increases from one section to another section;
- a primary outlet means for material of greater density being located closely adjacent said another section, the primary outlet means being separate from a secondary outlet means which is located in said chamber for exit of material of lesser density;
- inlet means associated with the chamber;
- whereby a mixture of materials of different densities enters the chamber through said inlet means and travels in said chamber in a spiralling vortex and said material of greater density travels progressively outwardly from said one section to said another section to exit from said chamber through said primary outlet entrained with a minimal amount of material of lesser density.

DESCRIPTION OF THE PREFERRED EMBODIMENTS

The external periphery of the chamber may be of any form. Suitably, in transverse cross-section, the periphery approaches a circular form. Alternatively, the periphery may be involute in cross-section such that the chamber is in the form of a spiralling passage.

As stated above, the external periphery of at least part of the chamber increases from one section to another section. In other words, the chamber gets progressively wider from one section to another section. The degree of taper need not necessarily be uniform. However, it is preferred that at least part of the chamber is frusto-conical in form.

The chamber of the vessel may be defined by said one section at one end and said another section at the other end. Alternatively, there may be more than one part of the chamber in which the external periphery progressively increases from one section to another section. In one preferred form there are two communicating parts wherein each part is defined by said one section and said another section, said parts having a common longitudinal axis the parts being joined at a common junction at their respective another sections. In such a form, it is preferred that there is a common primary outlet means for both parts located in the periphery of the vessel at the common junction.

The primary outlet means for the emission of the material of greater density may be located in the external periphery of the vessel. Alternatively, the vessel may have a first end wall located at the widest section of the chamber and the primary outlet means may be located at the junction of the external periphery and the end wall. The primary outlet means may include a conduit or passage.

The vessel may also have a second end wall located at said one section of the chamber. The secondary outlet means for the emission of material of lesser density may be located in either the first end wall or the second end wall. Preferably, it is located in the second end wall. The secondary outlet may be in the form of a vent since the material of lesser density is typically gaseous material such as air.

The inlet means may be located at or adjacent said one section of the vessel. The inlet means may extend through the periphery of the vessel. Preferably the inlet means comprises a pipe or conduit intersecting tangentially with the periphery of the vessel so that the mixture of material enters the chamber tangentially to the inner surface of the periphery.

The vessel may be further provided with a propelling means to propel the mixture of material through the inlet means. The propelling means may be of any suitable type and thus include a piston pump or more suitably a centrifugal pump having an impeller which may be single stage or multi stage. Alternatively an air blower or fan may be utilised which may generate a source of pressurised air. Suitably when a fan is utilised this may include a single impeller or rotor having a hub and a plurality of outwardly extending blades which may be curved or plate like. Alternatively a series of fans may be utilised which all rotate in unison to generate a stream of pressurised air.

The propelling means may be located externally of the chamber to propel the mixture of material along the inlet conduit. Alternatively, the propelling means may be located internally of the chamber, the propelling means drawing in the mixture and propelling it towards the periphery of the chamber.

DESCRIPTION OF DRAWINGS

Reference may now be made to a preferred embodiment of the invention as shown in the attached drawings wherein.

Figure 2:
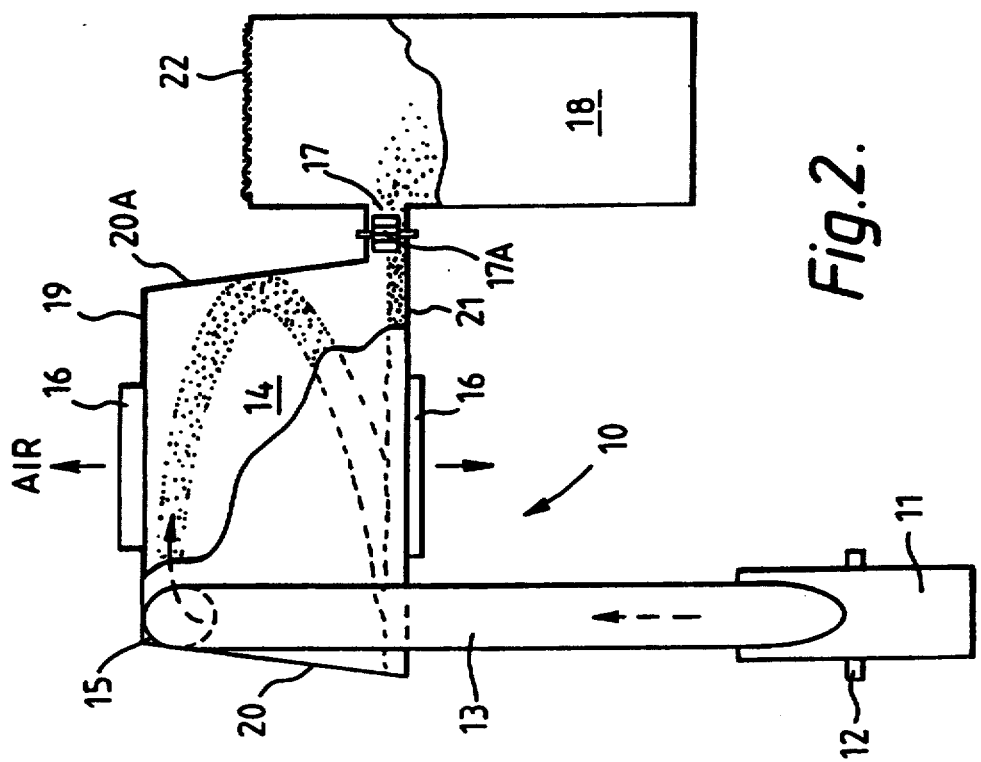
FIG. 2 is a side view of the separation apparatus shown in FIG. 1.
Figure 1:
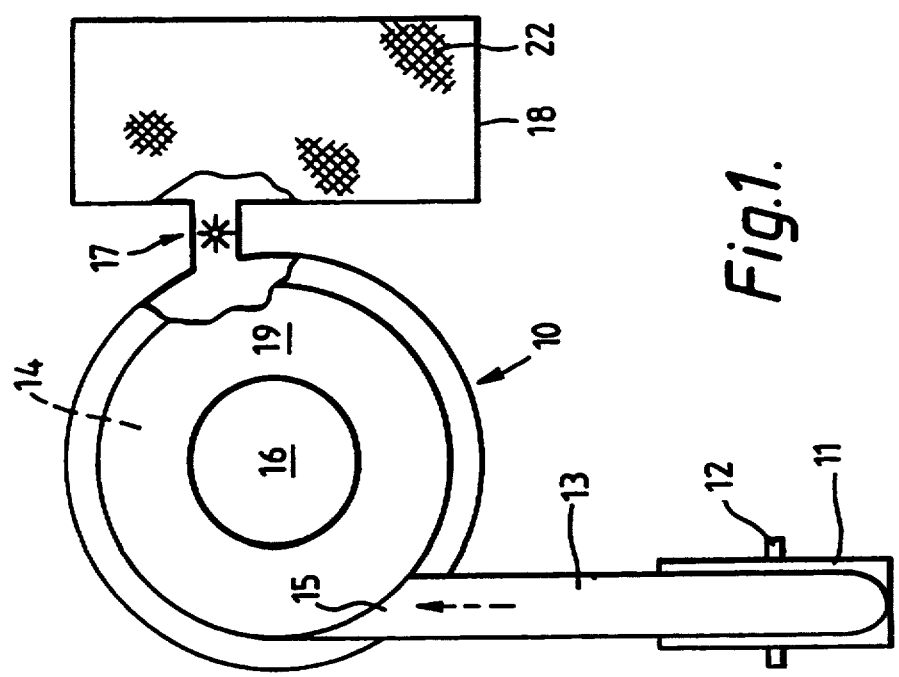
FIG. 1 is a plan view of a separation apparatus constructed in accordance with a first embodiment of the invention.

In the drawings in FIGS. 1-2 there is shown separation apparatus 10 including fan housing 11 including a fan (not shown) which is supported on an axle 12, inlet conduit 13 which communicates with separation chamber 14 at 15, air exits 16 of separation chamber 14, particulate material exit 17 and collection vessel 18 for particulate material. There also may be included agitator 17A in exit 17 to facilitate the flow of particulate material into collection vessel 18. The particulate material enters chamber 14 at the narrowest part (i.e. adjacent top wall 19) and is forced by centripetal force to form a vortex spiralling downwardly against the internal surface 20 of continuous side wall 20A of chamber 14. This causes the particulate material to move to the widest part of chamber 14 to exit through exit 17 adjacent bottom wall 21 together with a minimal amount of air which facilitates transfer of particulate material into collection vessel 18. The air may subsequently pass through mesh panel 22 located on top of vessel 18. The major part of the air is vented through exits 16. However, only a single vent 16 may be required.

Figure 3:
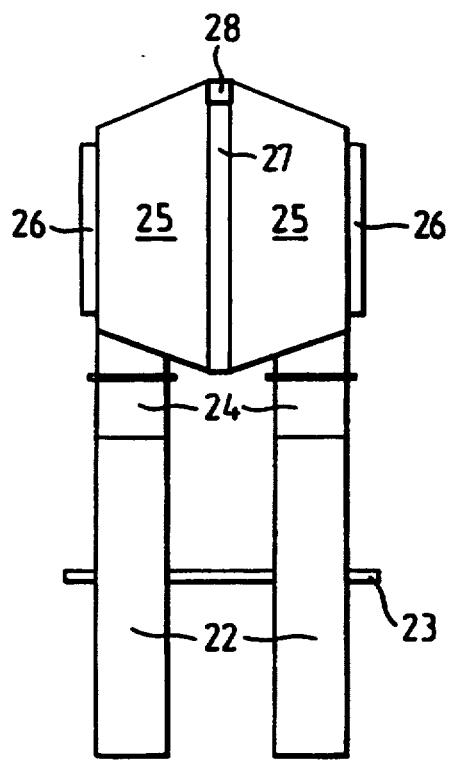
FIG. 3 is a top view of a separation apparatus constructed in accordance with a second embodiment of the invention.
Figure 4:
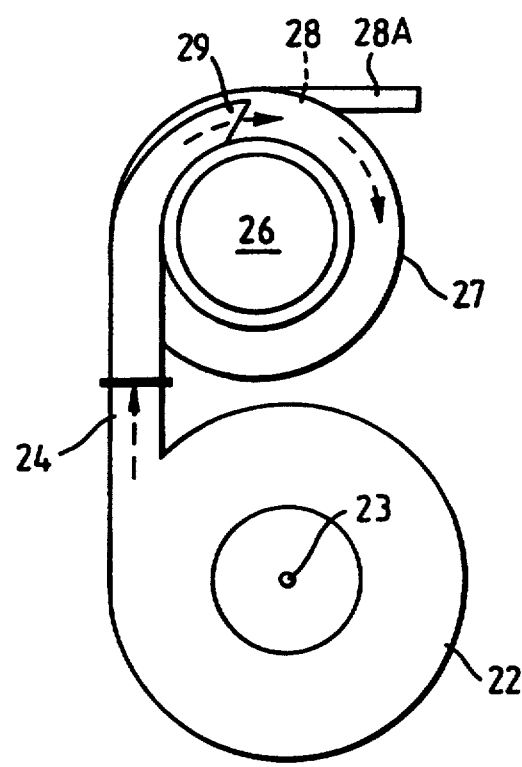
FIG. 4 is a side view of the separation apparatus shown in FIG. 3.

In FIGS. 3-4 there is shown an assembly of a pair of fans or impellers (not shown) located in housings 2 and mounted on a common shaft 23. A supply of particulate material entrained with air is then transported along inlet conduits 24 to an associated separation chamber 25 having air vents 26. The major part of the air is vented through air vents 26 while particulate material entrained with a minimal amount of air then advances to collection zone 27 located intermediate chambers 25 and through outlet 28 and through duct 28A to a collection vessel (not shown). Inlet conduits 24 enter each chamber 25 tangentially at 9 and a similar flow path of particulate material occurs as is already described in the embodiment of FIGS. 1-2. The embodiment of FIGS. 3-4 shows that a number of separation assemblies constructed in accordance with the invention may be mounted in series if desired.

Figure 5:
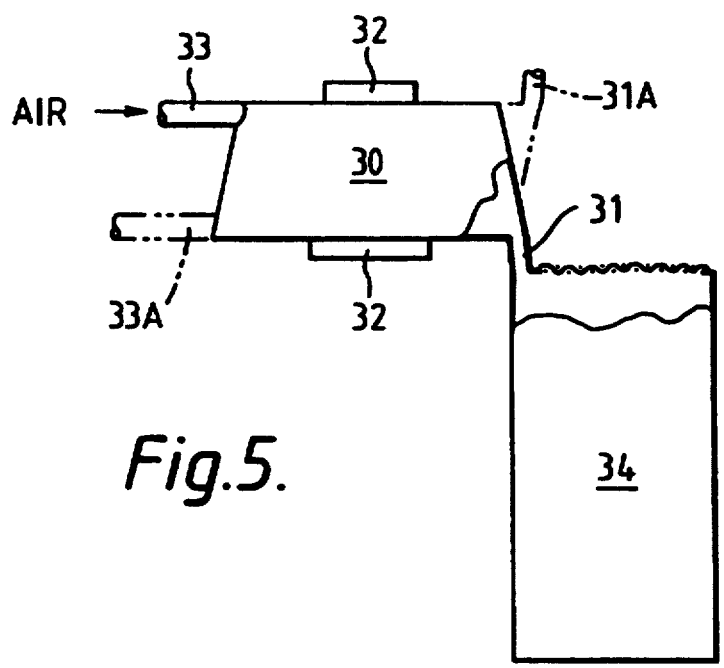
FIG. 5 is a side view of a separation apparatus constructed in accordance with a third embodiment of the invention.

The embodiment of FIG. 5 illustrates that the separation chamber 30 may have the outlet 31 located in a different position to outlet 17 shown in FIGS. 1-2. Air vents 32 are also illustrated as well as inlet conduit 33. Also shown is collection vessel 34. If desired however the position of vessel 30 may be reversed as shown in phantom with inlets 33A being provided at the bottom instead of the top. In this alternative arrangement exits 31A may be provided at the top. Thus, it is not essential in accordance with this invention to locate the inlets at the top of the separation chamber and thus they may be provided at the bottom of separation chamber 30 with the outlets at the top coinciding with the widest part of chamber 30. This shows that the invention is not dependent on gravity considerations as was the case with the prior art.

Figure 7:
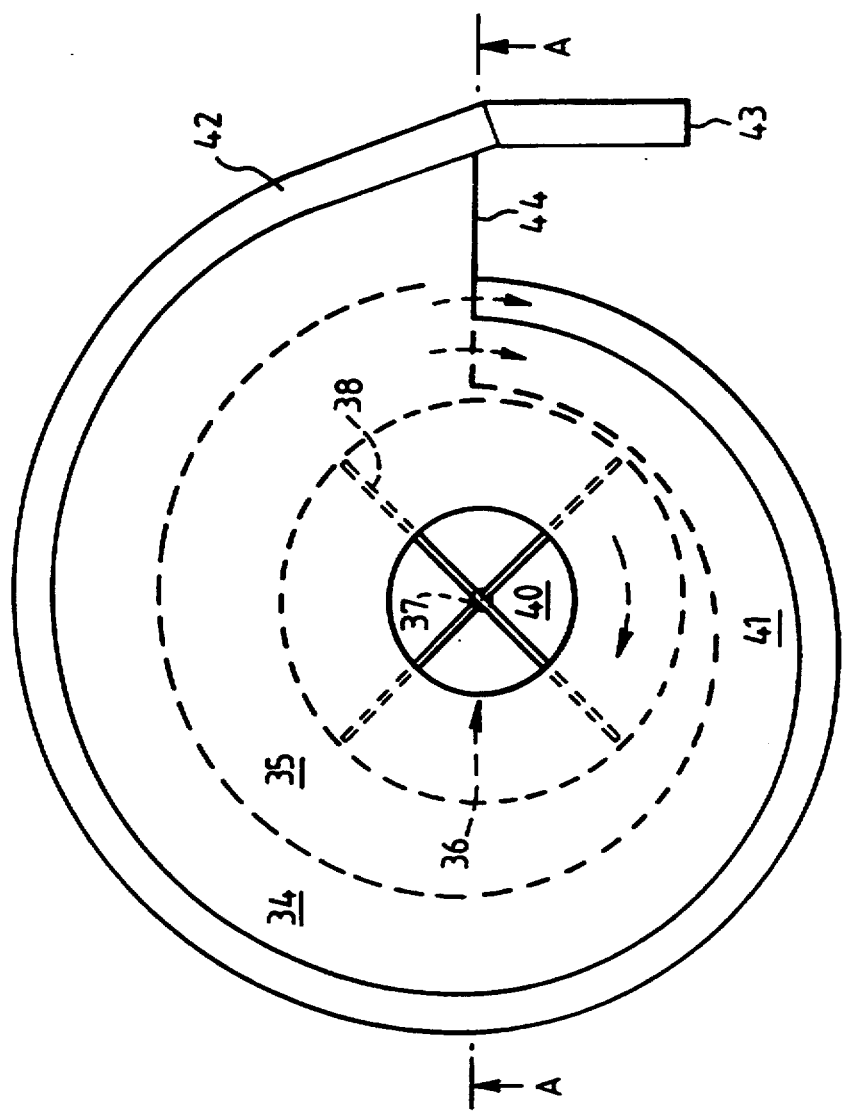
FIG. 7 is a front view of the separation apparatus shown in FIG. 6.
Figure 6:
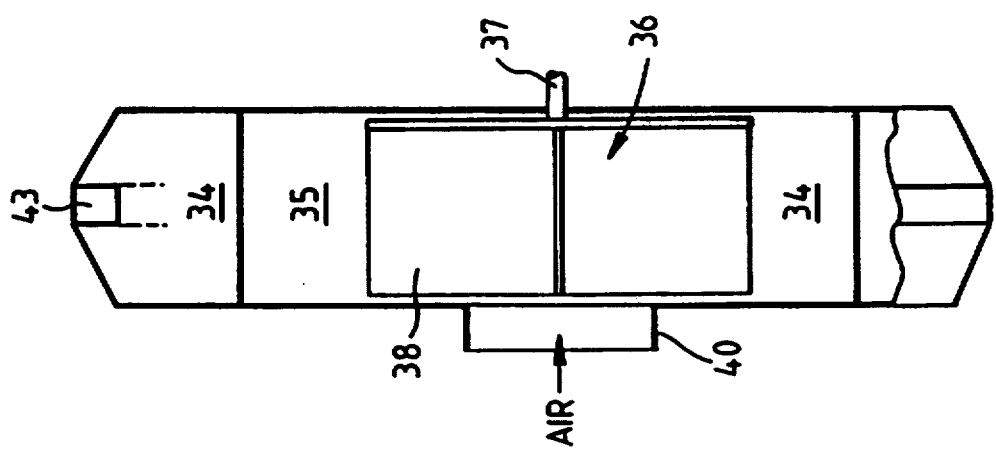
FIG. 6 is a side view of a separation apparatus constructed in accordance with a fourth embodiment of the invention.

The embodiment of FIG. 6-7 illustrates the situation where the separator chamber 34 may be located about the periphery of fan housing 35. There is also included fan rotor or impeller 36 mounted on rotating axle or shaft 37 and also having a plurality of blades 38. There is also shown inlet 40, separation chamber 41, outlet conduit 42 and opening exit 43. A mixture of particulate material and air is expelled from housing 35 into separation chamber 41. The continued circular movement of the particulate material causes the particulate material to move to the widest part of chamber 41 where it is concentrated in a narrow band and conducted to an appropriate storage area or collection receptacle (not shown) through outlet conduit 42. The remaining air is expelled through opening 43. It will be clear from the FIGS. 6-7 embodiment that the separation chamber may be located around or about the fan housing or be adjacent thereto and be connected thereto by an appropriate conduit as shown in the other embodiments. In any event it is preferred that the outlet conduit from the separation chamber be provided in the widest part of the separation chamber where the concentrated particulate material gathers.

It will be found that separation apparatus in accordance with the invention will suitably have internal volume in relation to the separation chamber compared to the internal volume of the fan housing or pump housing which is substantially the same. This is in specific contrast to the prior art where the internal volume of the separation chamber is substantially larger than the interior volume of the fan housing. This point illustrates that the separation apparatus of the invention has particular relevance for use in areas of limited space or limited storage capacity. Also transfer of particulate material to a suitable collection receptacle is facilitated by the fact that the particulate material exits from the separation chamber with a minimal amount of air.

It will also be appreciated that the separation housing or chamber because of its relatively compact size may be rotated if desired on a horizontal axis to change the position of the inlet and the outlet. This feature may be desirable in certain situations.

We claim:

1. A separation vessel for the separation of materials of different densities comprising:

a separation chamber with an external periphery with at least a part thereof progressively increasing in size from one section to another and the other section having a greater diameter than the one section, the external periphery being involute in transverse cross-section;

an inlet into the chamber through a side wall of the chamber;

an outlet from the chamber for material of lesser density, the outlet being located in the other section;

an outlet from the chamber for material of greater density and located adjacent and radially inwardly of the outlet for material of lesser density; and a propelling means within the chamber for drawing the materials into the chamber via the inlet and for causing the materials to flow through the chamber and out of the outlets.

2. The vessel of claim 1 including an outlet conduit extending around the other section and communicating with the outlet for material of lesser density.

3. The vessel of claim 1 wherein the propelling means comprises a fan having a plurality of blades mounted to a shaft extending centrally of the chamber adjacent the inlet.

* * * * *